United States Patent
Maher et al.

(10) Patent No.: US 11,053,789 B2
(45) Date of Patent: Jul. 6, 2021

(54) MACHINE LEARNING FOR PRODUCTION PREDICTION

(71) Applicant: Schlumberger Technology Corporation, Sugar Land, TX (US)

(72) Inventors: Gabriel Maher, Stanford, CA (US); Daniel D'Souza, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 483 days.

(21) Appl. No.: 16/067,157

(22) PCT Filed: Dec. 29, 2016

(86) PCT No.: PCT/US2016/069301
§ 371 (c)(1),
(2) Date: Jun. 29, 2018

(87) PCT Pub. No.: WO2017/117445
PCT Pub. Date: Jul. 6, 2017

(65) Prior Publication Data
US 2019/0024494 A1   Jan. 24, 2019

Related U.S. Application Data

(60) Provisional application No. 62/272,386, filed on Dec. 29, 2015.

(51) Int. Cl.
*G01V 1/40* (2006.01)
*E21B 44/00* (2006.01)
(Continued)

(52) U.S. Cl.
CPC ............ *E21B 44/00* (2013.01); *E21B 43/006* (2013.01); *G06N 3/02* (2013.01); *G06N 20/00* (2019.01);
(Continued)

(58) Field of Classification Search
CPC .................................................... E21B 44/00
(Continued)

(56) References Cited

U.S. PATENT DOCUMENTS 8,972,232 B2 *   3/2015   Sarma .................... G01V 1/308
                                                                703/9
10,450,841 B2 *  10/2019   Fulford ............... E21B 41/0092
(Continued)

FOREIGN PATENT DOCUMENTS

WO    2012/015518 A2    2/2012
WO    2015/171799 A1    11/2015

OTHER PUBLICATIONS

Biniwale, et al., "Managing LNG Deliverability: An Innovative Approach Using Neural Network and Proxy Modeling for Australian CSG Assets," SPE Middle East Health, Safety, Security, and Environment Conference and Exhibition, Abu Dhabi, UAE, Apr. 2-4, 2012, 17 pages.

(Continued)

*Primary Examiner* — Aditya S Bhat
(74) *Attorney, Agent, or Firm* — Colin L. Wier (57) ABSTRACT

Estimating a production prediction of a target well includes computing, based on production time series from training wells, a smoothed production history curves. Each smoothed production history curve corresponds to a training well. Based on the smoothed production history curves, a fitting function defined by a set of fitting coefficients is selected. A machine learning process determines, based on a set of well parameters for each training well, a set of predicted fitting coefficients as a function of a set of well parameters of the target well. Estimating the production prediction further includes applying the predicted fitting coefficients to the (Continued)

fitting function to compute a production prediction curve for the target well, and presenting the production prediction curve.

20 Claims, 8 Drawing Sheets

(51) Int. Cl.
*E21B 43/00* (2006.01)
*G06N 20/00* (2019.01)
*G06N 3/02* (2006.01)
*G06N 5/00* (2006.01)
*G06N 3/08* (2006.01)
*G06N 20/20* (2019.01)

(52) U.S. Cl.
CPC ............ *E21B 2200/22* (2020.05); *G06N 3/08* (2013.01); *G06N 5/003* (2013.01); *G06N 20/20* (2019.01)

(58) Field of Classification Search
USPC .......................................................... 702/6
See application file for complete search history.

(56) References Cited

U.S. PATENT DOCUMENTS

| | | |
|---|---|---|
| 2008/0077371 A1 | 3/2008 | Yeten et al. |
| 2008/0082469 A1 | 4/2008 | Wilkinson et al. |
| 2010/0161300 A1 | 6/2010 | Yeten et al. |
| 2014/0351183 A1 | 11/2014 | Germain et al. |

OTHER PUBLICATIONS

International Search Report and Written Opinion for the equivalent International patent application PCT/US2016/069301 dated Apr. 12, 2017, 3 pages.

Fulford, et al., "Machine Learning as a Reliable Technology for Evaluating Time-Rate Performance of Unconventional Wells," Sep. 30, 2015, pp. 1-29.

Frausto-Solis, et al., "Forecasting Oil Production Time Series with a Population-Based Simulated Annealing Method," Arabian Journal for Science and Engineering, Springer Berlin Heidelberg, Berlin/Heidelberg, vol. 40, No. 4, Feb. 10, 2015, pp. 1081-1096.

Klie, et al., "Physics-Based and Data-Driven Surrogates for Production Forecasting," Feb. 25, 2015.

Extended Search Report for the equivalent European patent application 16882693.1 dated Jul. 19, 2019.

Article 94(3) EPC communication for the equivalent European patent application 168826931.1 dated Apr. 22, 2020.

* cited by examiner

MACHINE LEARNING FOR PRODUCTION PREDICTION

CROSS-REFERENCE TO RELATED APPLICATIONS

This application claims priority to U.S. Provisional Patent Application Ser. No. 62/272,386, filed on Dec. 29, 2015 and entitled, "Approximate Production Prediction", which is incorporated herein by reference in its entirety.

BACKGROUND

During coalification of organic matter in sediments, large quantities of methane-rich gas are generated and stored within the coal on internal surfaces. Because coal has such a large internal surface area, the coal can store large volumes of methane-rich gas generically known as coal-bed methane (CBM). Production of coal-bed methane, however, poses some specific technological and environmental difficulties as water is drawn off first to lower the pressure, so methane can flow out of the coal and to the well bore. For the planning and development of CBM wells, estimating the volumes of gas and water that may be produced during well operation is useful in order to have the storage equipment. Additionally, the amount of gas produced determines how many wells should be constructed in a particular area to comply with delivery demands.

SUMMARY

In general, embodiments are directed to a method for estimating a production prediction of a target well. Estimating a production prediction of a target well includes computing, based on production time series from training wells, a smoothed production history curves. Each smoothed production history curve corresponds to a training well. Based on the smoothed production history curves, a fitting function defined by a set of fitting coefficients is selected. A machine learning process determines, based on a set of well parameters for each training well, a set of predicted fitting coefficients as a function of a set of well parameters of the target well. Estimating the production prediction further includes applying the predicted fitting coefficients to the fitting function to compute a production prediction curve for the target well, and presenting the production prediction curve.

Other aspects of the technology will be apparent from the following description and the appended claims.

BRIEF DESCRIPTION OF DRAWINGS

FIGS. 3, 4.1, and 4.2 show flowcharts in accordance with one or more embodiments.

FIGS. 5, 6.1, 6.2, 7.1 and 7.2 show examples in accordance with one or more embodiments.

FIGS. 8.1 and 8.2 shows a computer system in accordance with one or more embodiments.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments may be applied to estimating quantities related to gas and water production from wells (and in particular CBM wells) using information about the well in accordance with one or more embodiments of the technology. Specifically, in accordance with one or more embodiments of the technology, the production time series of a well, given the well parameters, takes as input the well parameters and outputs the production prediction curve for the well.

One or more embodiments may be applied to a workflow combining field data and software tools to analyze available production prediction curve of production data for the producing wells over the remaining life of the well. One or more embodiments may analyze multiple production time series of production data over multiple computer learning iterations to determine multiple time series of production for future well production. Based on quantitative forecasting of the well production output, a technical and economic strategy of well equipment and operation may be implemented. One or more embodiments may be applied to a single target well or scaled to multiple target wells to perform production prediction estimation.

In accordance with one or more embodiments of the technology, the technology involves at least a predictive analytical method, for the prediction of quantities of interest related to CBM wells, as well as other wells with similar characteristics. In accordance with one or more embodiments of the technology, the method, system, and computer readable medium described herein improves on previous approaches by, at least, avoiding the clustering phase (i.e., segregating the wells into clusters). Specifically, after a data processing stage and machine learning stage, production profiles can be estimated directly for a new well using the method, system, and computer readable medium in accordance with one or more embodiments of the technology.

Figure 1:
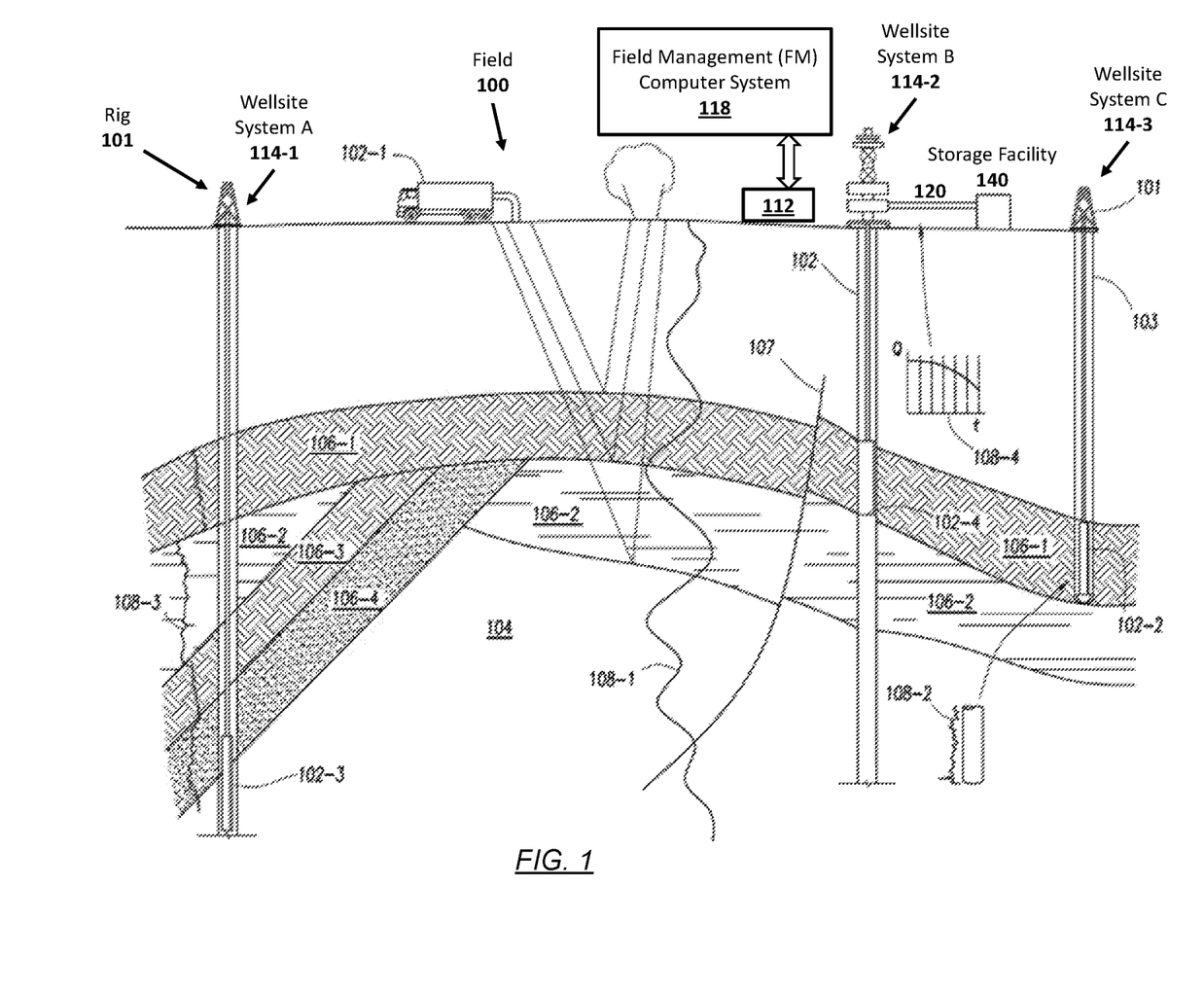
FIG. 1 is a schematic view, partially in cross-section, of a field in which one or more embodiments of approximate production prediction may be implemented.

FIG. 1 depicts a schematic view, partially in cross section, of a field (100) in which one or more embodiments of the technology may be implemented. In one or more embodiments, the field may be an oilfield. In other embodiments, the field may be a different type of field. In one or more embodiments, one or more of the components and elements shown in FIG. 1 may be omitted, repeated, and/or substituted. Accordingly, embodiments should not be considered limited to the specific arrangements of components shown in FIG. 1.

A geologic sedimentary basin contains subterranean formations (104). As shown in FIG. 1, the subterranean formation (104) may include several geological structures (106-1 through 106-4). As shown, the formation may include multiple geological layers, for example, a sandstone layer (106-1), a shale layer (106-2), another sandstone layer (106-3), and a limestone layer (106-4). A fault plane (107) may extend through the formation. In particular, the geologic sedimentary basin includes rock formations and at least one subsurface reservoir including fluids. In one or more embodiments, the rock formations include at least one seal formation, for example, the shale layer (106-2), which may act as a base seal. In one or more embodiments, various survey tools and/or data acquisition tools are adapted to measure the formation and operating parameters of the wells in the field (100). Generally, survey operations and wellbore operations are referred to as field operations of the field (100). These field operations may be performed as directed by the surface unit (112). More specifically, FIG. 1 depicts a production operation being performed by a production tool (102-4) deployed from a production well (114-2) and into a completed wellbore (102) for drawing fluid from the downhole reservoirs into the storage facility (140). Fluid flows from reservoir (106-1) through perforations in the casing (not shown) and into the production well (114-2) in the wellbore (102) and to the storage facilities (140) via a gathering network (120).

Sensors (S), such as gauges, may be positioned about the field to collect data relating to various field operations as described previously. The data gathered by the sensors (S) may be collected by the surface unit (112) and/or other data collection sources for analysis or other processing. The data collected by the sensors (S) may be used alone or in combination with other data. The data may be collected in one or more databases or transmitted on or offsite. At least a select portions of the data may be selectively used for analyzing and/or predicting production of the current and/or other wellbores. The data may be may be historical data, real time data or combinations thereof. The real time data may be used in real time, or stored for later use. The data may also be combined with historical data or other inputs for further analysis. The data may be stored in separate databases, or combined into a single database.

Figure 81:
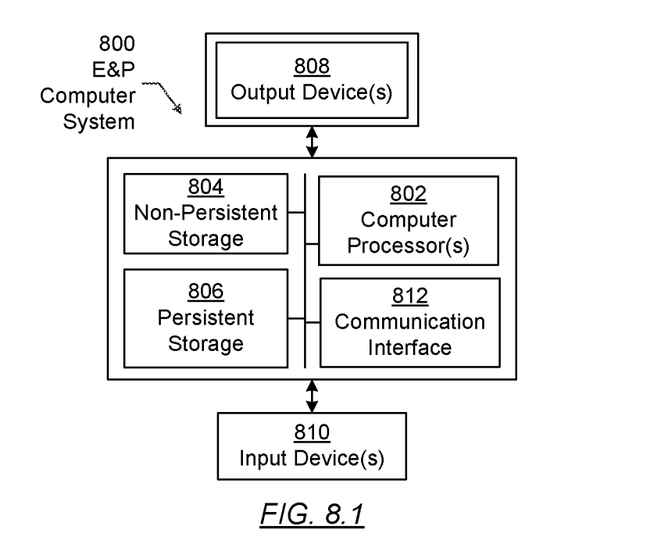
Figure 82:
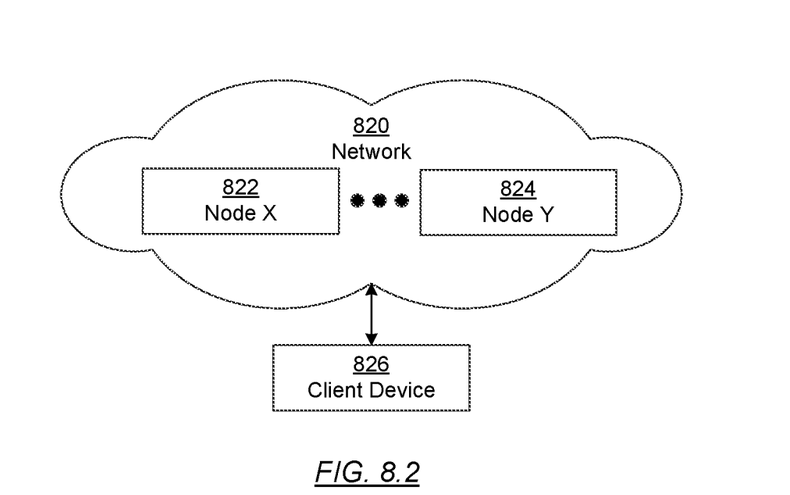

In one or more embodiments, the surface unit (112) is communicatively coupled to the field management (FM) computer system (116). The FM computer system may be the computer system described in FIGS. 8.1 and 8.2. In one or more embodiments, the data received by the surface unit (112) may be sent to the FM computer system (118) for further analysis. Generally, the FM computer system (118) is configured to analyze, model, control, optimize, or perform management tasks of the aforementioned field operations based on the data provided from the surface unit (112). In one or more embodiments, the FM computer system (118) is provided with functionality for manipulating and analyzing the data, such as performing data analysis, simulation, planning, and optimization of production operations of the wellsite system A (114-1), wellsite system B (114-2), and/or wellsite system C (114-3). In one or more embodiments, the result generated by the FM computer system (118) may be displayed for an analyst user to view the result in a 2D display, 3D display, or other suitable displays. Although the surface unit (112) is shown as separate from the FM computer system (118) in FIG. 1, in other examples, the surface unit (112) and the FM computer system (118) may also be combined. In one or more embodiments, the data received by the surface unit (112) represents production information and information regarding the operating parameters of wells in the field (100).

Although FIG. 1 shows a field (100) on the land, the field (100) may be an offshore field. In such a scenario, the subterranean formation may be in the sea floor. Further, field data may be gathered from the field (100) that is an offshore field using a variety of offshore techniques for gathering field data.

Figure 2:
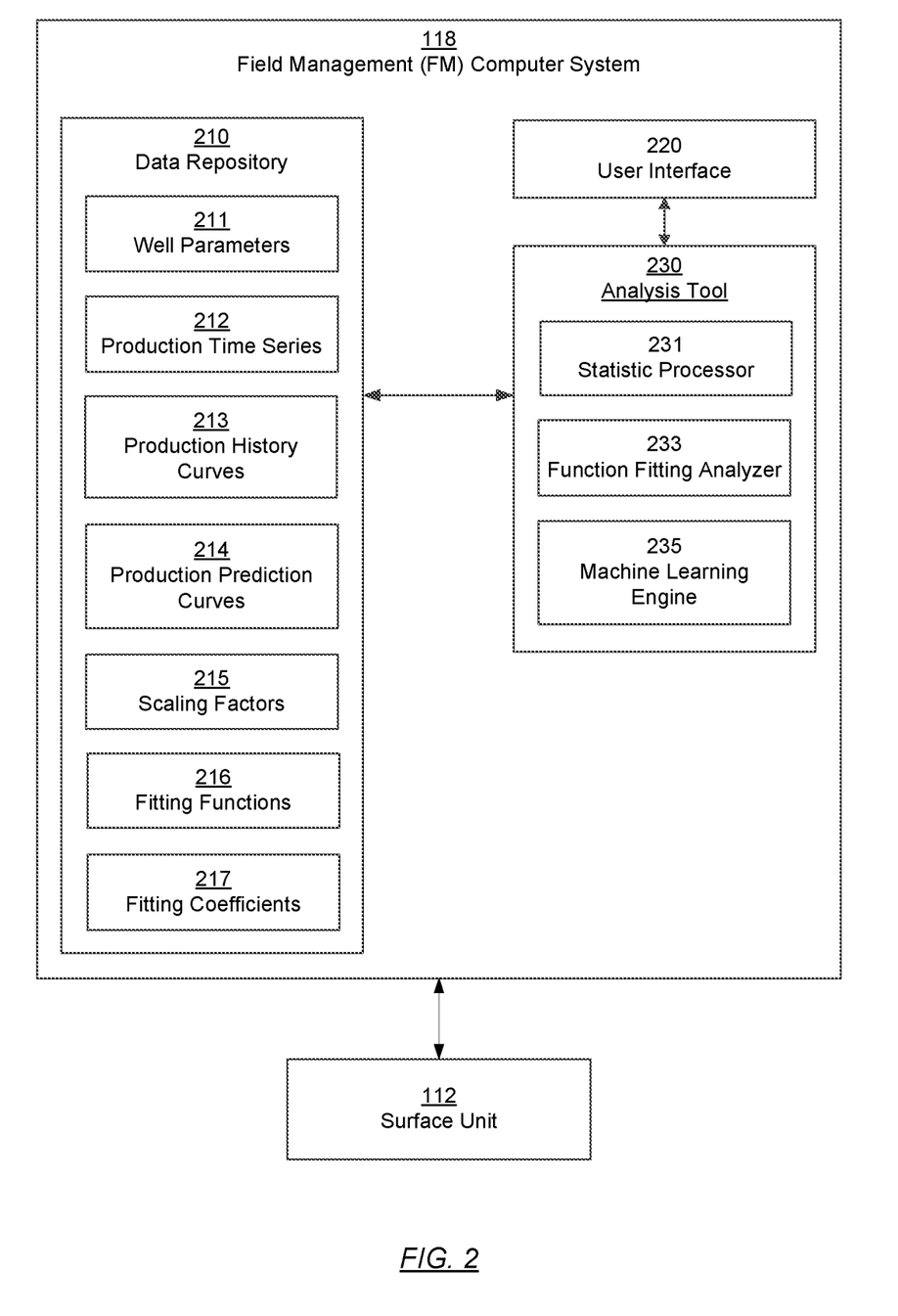
FIG. 2 shows a diagram of a system in accordance with one or more embodiments.

FIG. 2 shows more details of the FM computer system (118) in which one or more embodiments of the technology may be implemented. In one or more embodiments, one or more of the modules and elements shown in FIG. 2 may be omitted, repeated, and/or substituted. Accordingly, embodiments of the technology should not be considered limited to the specific arrangements of modules shown in FIG. 2.

As shown in FIG. 2, the FM computer system (118) includes a data repository (210) for storing input data, intermediate data, and resultant outputs of the analysis data. The FM computer system may further include a user interface (220) and an analysis tool (230). In one or more embodiments of the technology, the data repository (210) may include one or more disk drive storage devices, one or more semiconductor storage devices, other suitable computer data storage devices, or combinations thereof. In one or more embodiments, content stored in the data repository (210) may be stored as a data file, a linked list, a data sequence, a database, a graphical representation, any other suitable data structure, or combinations thereof. The multiple different storage units and/or devices may or may not be of the same type or located at the same physical site.

In one or more embodiments, the content stored, in whole or in part, temporary or permanently, in the data repository (210) includes well parameters (211), production time series (212), production history curves (213), production prediction curves (214), scaling factors (215), fitting functions (216), and fitting coefficients (217). Each of these components is discussed below.

The well parameters (211) are sets of mechanical specifications and operating parameters that define a well operating condition. In one or more embodiments, the well may be a CBM well. In one or more embodiments, the well, whether or not a CBM well, may be a training well. A training well is a well with known production data that is used to train the machine learning. In one or more embodiments, the well, whether or not a CBM well, may be a target well. A target well is a well with unknown production data for which the machine learning indirectly predicts the production. In one or more embodiments, the well parameters (211) of training wells and of target wells are input data to a machine learning process that is configured to obtain approximate production predictions for the target wells. In one or more embodiments, the approximate production prediction may be the water or natural methane production of a CBM well. For example, the well parameters may be the parameters referring to the location of the well, the total depth of the well, pressure at the bottom of the well, the size of the wellbore and casing pipes, the type of the pump used to extract the water from the well or the pump capacity and operating speed.

The production time series (212) are time series of data characterizing the well production over time. In one or more embodiments, the production time series (212) are a set of successive field measurements of a well production at a various moments in time. In one or more embodiments, the successive field measurements may be recorded at defined time intervals. The defined time intervals may be defined by a user at run time, predefined in the system or otherwise defined. In one or more embodiments, at least a portion of the values of the production time series (212) are based on measurements obtained from the data acquisition tools depicted in FIG. 1 above. For example, production time series (212) may include methane gas production data or water production data from a CBM well. The collected data may be used to perform analysis, such as statistical analysis. The field measurements may be generated directly from the sensors (S), or after some preprocessing or modeling. The data outputs may act as inputs for further analysis.

The production history curves (213) are graphical representations of the historical production data from wells, the production being represented by continuous curves on a plot of production amount versus time. In one or more embodiments, the production data may be a production time series. In one or more embodiments, a production history curve may be obtained by connecting each point of the production time series in the graphical representation to the next point in the production time series. In one or more embodiments, the production history curve may be smoothed using a smoothing algorithm to obtain a smoothed production history curve. In one or more embodiments, the smoothed production history curve may be normalized using a normalization algorithm to obtain a normalized production history curve. The normalization adjust the values measured of production history curve measured at different scales to a notionally common scale, for example, to a unit scale interval. In other words, the normalization normalizes the production amounts across multiple training wells.

The production prediction curves (214) are graphical representations of the future production data of wells, the production being represented by continuous curves on a plot of production amount versus time. In one or more embodiments, a production prediction curve of a target well may be obtained from a machine learning process based on a set of well parameters characterizing the well. In one or more embodiments, the production prediction curve may be a normalized production prediction curve as obtained from a machine learning algorithm. In one or more embodiments, the production prediction curve may be scaled using a scaling algorithm to obtain a scaled production prediction curve.

The scaling factors (215) are constant values applied to datasets to obtain a normalized datasets. In one or more embodiments, a normalized dataset is proportional with the original dataset, the proportionality constant being the scaling factor. In one or more embodiments, the dataset may be represented by a curve, a function or any other form of data representation. For example, a smoothed production history curve or a production prediction curve may be a dataset. In one or more embodiments, a scaling factor may be applied to a normalized data set to scale the dataset to a scaled dataset. The scaling reverses the normalization so that the dataset reflects the production amount of the well. For example, different scaling factors may be applied to different datasets to plot the datasets within the same scale interval in order to compare the datasets.

The fitting functions (216) are mathematical functions described each by an algebraic equation. In one or more embodiments, a fitting function may be any function that can be fitted to a dataset. In one or more embodiments, the fitting function may be used as an aid for dataset visualization, to infer values of a dataset at locations where no data are available, and to define a relationship among two or more variables. In one or more embodiments, the fitting function replaces the dataset in further processing and analysis operations performed on the dataset. In one or more embodiments, the shape of the dataset in graphical representation of the dataset may be used to select a fitting function for the dataset. For example, a Gaussian function may be fitted to a bell shaped curve dataset, an exponential decay function may be fitted to a production history curve of a well or to a production prediction curve for a well.

The fitting coefficients (217) are sets of values for a set of independent variables defining the fitting functions. In one or more embodiments, the independent variables defining the fitting functions may take various values each to obtain various degrees of fitting for a fitting function to a dataset. In one or more embodiments, a set of fitting coefficients may be selected by an optimization process to obtain a best fit of a fitting function to a dataset. In one or more embodiments, the fitting coefficients may be characterize the well production data of a training well. In one or more embodiments, the fitting coefficients may be characterize the predicted well production data of a target well. The fitting coefficients and the predicted fitting coefficients refer to the values for the set of independent variables defining the same fitting function.

Continuing with FIG. 2, the FM computer system (118) includes a user interface (220) in accordance with one or more embodiments. In one or more embodiments, the user interface (220) corresponds to a graphical user interface (GUI) that includes functionality to receive input from a user and present or display graphical data to the user. The user interface (220) may include a field viewer, a 3D subsurface reservoir viewer, a 2D section of subsurface reservoir profile viewer, a well completion viewer, a well production data viewer, and input fields in accordance with one or more embodiments. The input fields include functionality to receive input values from a user in order to be assigned to variables. For example, the input fields may include a data fitting function selection box, a selector for the function fitting coefficients, a machine learning method selection box, a well parameter selection box, a function and data plotter, a fluid type selector, or any other parameter for approximating the production prediction from a well. In one or more embodiments, the input fields may include selection boxes, text fields, drop-down menus, or any other type of field for a user to input data.

Although not shown the system may include additional interfaces, such as an application programming interface. The application programming interface may provide functionality for capturing the production data for further analysis based on the data collection procedure. For example, the application programming interface may obtain actual production time series from the surface unit (112) using a connection defined in a data collection procedure. The actual production time series may be the recorded water or gas production of a well during a production period. Further, the actual production time series may be obtained from the surface unit (112) based on a schedule (e.g., daily, weekly, monthly, quarterly, etc.) defined by the user or preconfigured in the system. In another example, the user interface (220) may be configured to receive production data manually entered by a user as parameters defined in the data acquisition schedule. Although the various interfaces are described with respect to the data acquisition and analysis, the various interfaces may include additional user interface components for oilfield operation. For example, the various interfaces may include components for simulation and economic calculations, components for interacting with the oilfield, including sending commands to the oilfield, and other components that are not shown or expressly described above.

Continuing with FIG. 2, the FM computer system (118) additionally includes an analysis tool (230) in accordance with one or more embodiments. The analysis tool (230)

includes a statistic processor (231), a function fitting analyzer (233), and a machine learning engine (235). Each of these components is described below.

The statistic processor (231) is a software component that includes functionality to statistically analyze and process the datasets. In one or more embodiments, the statistic processor (231) is configured to inspect, smooth, normalize, scale and model datasets in order to extract information, visualize, and find parameters characterizing the datasets.

The function fitting analyzer (233) is a software component that is configured to determine the fitting coefficients for a fitting function in order for the fitting function to best fit a dataset. In one or more embodiments, the function fitting analyzer (233) determine the fitting coefficients based on known dataset by performing statistical analysis on the dataset. For example, a production history curve may be statistically analyzed to determine a set of fitting coefficients for a function in order to approximate the production history curve. In one or more embodiments, the function fitting analyzer (233) finds the fitting coefficients for a fitting function by applying an optimization process to the dataset to be fitted with the fitting function. In one or more embodiments, the optimization process may attempt to minimize the vertical (y-axis) distance between each point from the dataset and the fitting function. In one or more embodiments, the optimization process may attempt to minimize the orthogonal distance between each point from the dataset and the fitting function, or to otherwise include both axes of displacement of each point from the dataset to the fitting function. For example, a least square method may be used to optimize the fitting process and find a set of fitting coefficients.

The machine learning engine (235) is a software tool configured to determine the fitting coefficients for predicting a production of a well based on a set of well parameters. In other words, the machine learning engine is determining a set of predicted fitting coefficients (e.g., for a target well) based on a learned relationship between well parameters and known fitting coefficients of wells with historical production dataset (e.g., from training wells). The machine learning engine (235) is further configured to apply the learned relationship to determine a set of predicted coefficients of a prediction well (target well) based on the prediction well parameters. In one or more embodiments, the machine learning engine (235) provides the FM computer system the ability to learn to select the predicted fitting coefficients without being explicitly programmed by a user. In one or more embodiments, the machine learning engine (235) is configured to adapt the finding process when exposed to new sets of well parameters. In one or more embodiments, the machine learning engine (235) is configured to search through a set of well parameters of wells having historical production datasets (training wells), to look for patterns that relate the well parameters to the fitting coefficients of a fitting function approximating the historical production datasets. In one or more embodiments, the machine learning engine (235) may use the found patterns to adjust the fitting coefficients finding method. In one or more embodiments, the patterns are used to apply what has been learned in from the historical production datasets to the predicted production datasets. For example, the machine learning engine (235) may be trained to use the fitting coefficients of a fitting function describing multiple normalized production history curves to obtain a set of fitting coefficients for a fitting function describing a production prediction curve.

In one or more embodiments, the surface unit (112) is configured to generate a field operation control signal based at least on a result generated by the FM computer system (118), such as changing the operating conditions of the production equipment (114-2) depicted in FIG. 1 above. As noted above, the field operation equipment depicted in FIG. 1 may be controlled by the field operation control signal. For example, the field operation control signal may be used to control a production equipment, an actuator, a fluid valve, or other electrical and/or mechanical devices disposed about the field (100). In one or more embodiments, surface unit (112) is configured to acquire a set of field measurements from the field regarding one or more properties of the subsurface formations, well operation and specifications.

While FIG. 2 shows a configuration of components, other configurations may be used without departing from the scope of the method. For example, various components may be combined to create a single component. As another example, the functionality performed by a single component may be performed by two or more components.

Figure 3:
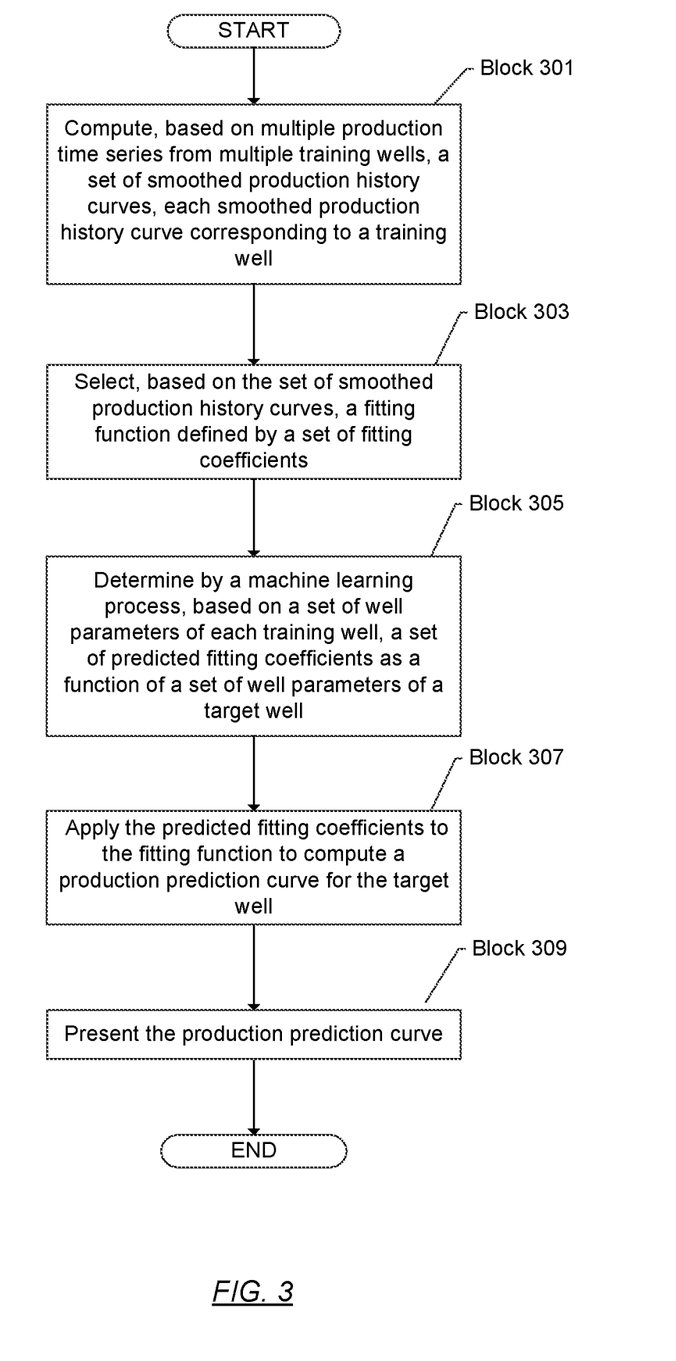

FIG. 3 depicts a flowchart of an example method in accordance with one or more embodiments. For example, the method depicted in FIG. 3 may be practiced using the FM computer system (118) described in reference to FIGS. 1 and 2 above. In one or more embodiments, one or more of the elements shown in FIG. 3 may be omitted, repeated, and/or performed in a different order. Accordingly, one or more embodiments should not be considered limited to the specific arrangements of elements shown in FIG. 3.

Figure 41:
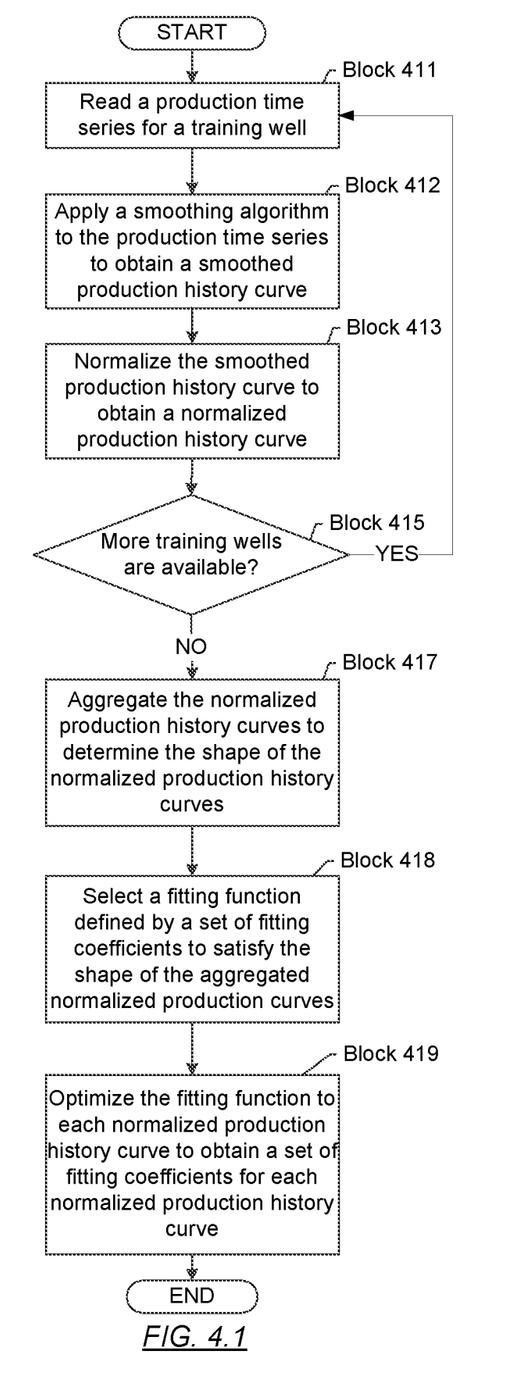
Figure 71:
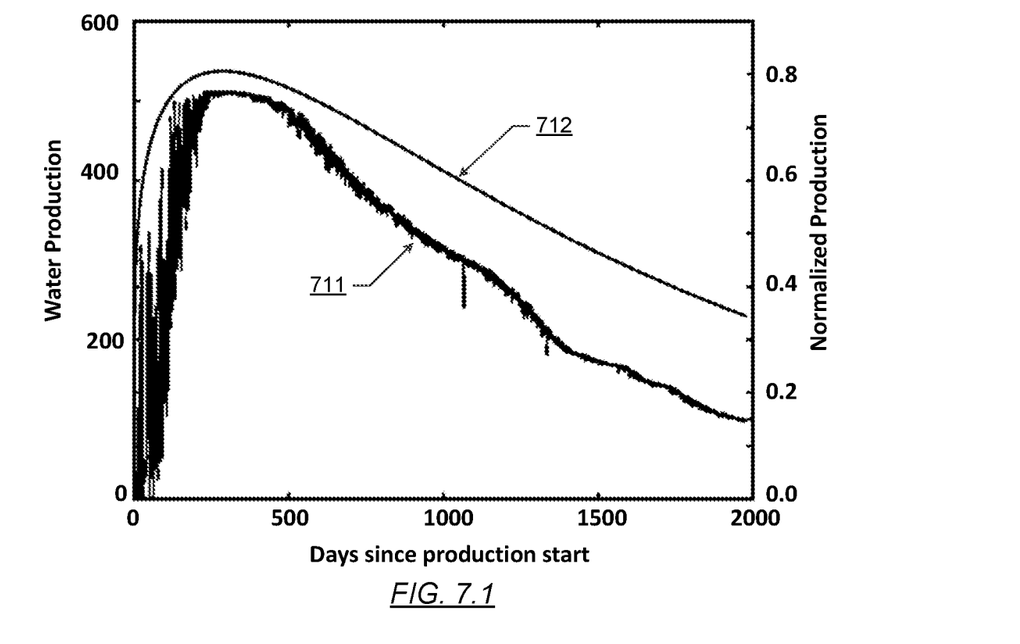

In Block 301, a set of smoothed production history curves is computed based on multiple production time series from multiple training wells, each smoothed production history curve corresponding to a training well. In one or more embodiments, the training wells are a selection of wells with available historical production data, the historical production data being processed by a statistic processor to obtain a production history curve for each well in a process described in more detail in FIG. 4.1. In one or more embodiments, the production time series from multiple training wells are read by a statistic processor and modeled to graphically represent the production amount over time using a smoothing algorithm applied on each production time series. For example, the process described in more detail in FIG. 4.1 and FIG. 7.1 may be used. In one or more embodiments, the smoothing algorithm creates an approximating curve along the production time series, the smoothed production history curve, capturing the trend in the data, while leaving out noise or other fine-scale variation in the production time series.

In Block 303, a fitting function defined by a set of fitting coefficients is selected, based on the set of smoothed production history curves. In one or more embodiments, the fitting function may be selected by analyzing the shape of the smoothed production history curves and selecting, from a set of available fitting functions, the fitting function with the graphical representation that is most similar to the smoothed production history curves. In one or more embodiments, the fitting function may be selected by statistically comparing the results of the fitting operation to select the fitting function that minimizes a residual value. In one or more embodiments, the residual value may be calculated by a statistic processor for each smoothed production history curve and each fitting function from the set of available fitting functions. In one or more embodiments, the residual value is quantifying the difference between the smoothed production history curve and the graphical representation of the fitting functions. Further, based on the average of residual value, a fitting function having the lowest average of residual values is selected.

In Block 305, a set of predicted fitting coefficients are determined by a machine learning process as a function of a set of well parameters of a target well, based on a set of well parameters of each training well. In one or more embodiments, the target well is a well designated to determine a production prediction curve for the well. In one or more embodiments, the predicted fitting coefficients are the fitting coefficients for predicting the production of the target well. In one or more embodiments, a machine learning engine is trained to predict the fitting coefficients based on the relationship, for each training well, between the fitting coefficients used to fit the smoothed production history curves and the well parameters. In one or more embodiments, during the learning process the learning engine searches through the set of well parameters of the training wells to find patterns that relates the training well parameters to the fitting coefficients of the fitting function used to fit the production history data of the training wells. In one or more embodiments, based on the found patterns the predicted fitting coefficients are proposed for the target well. For example, a machine learning process may be a k-nearest neighbor process or a random forest process.

In Block 307, the predicted fitting coefficients are applied to the fitting function to compute a normalized production prediction curve for the target well. In one or more embodiments, the fitting coefficients predicted by the machine learning process are passed to the fitting function selected in Block 303 to obtain a production prediction curve for the target well.

In Block 309, the production prediction curve is presented. In one or more embodiments, the production prediction curve is presented on a user interface for further analysis and decision making. For example, a size for a surface reservoir to collect production water may be decided based on the production prediction curve.

Figure 42:
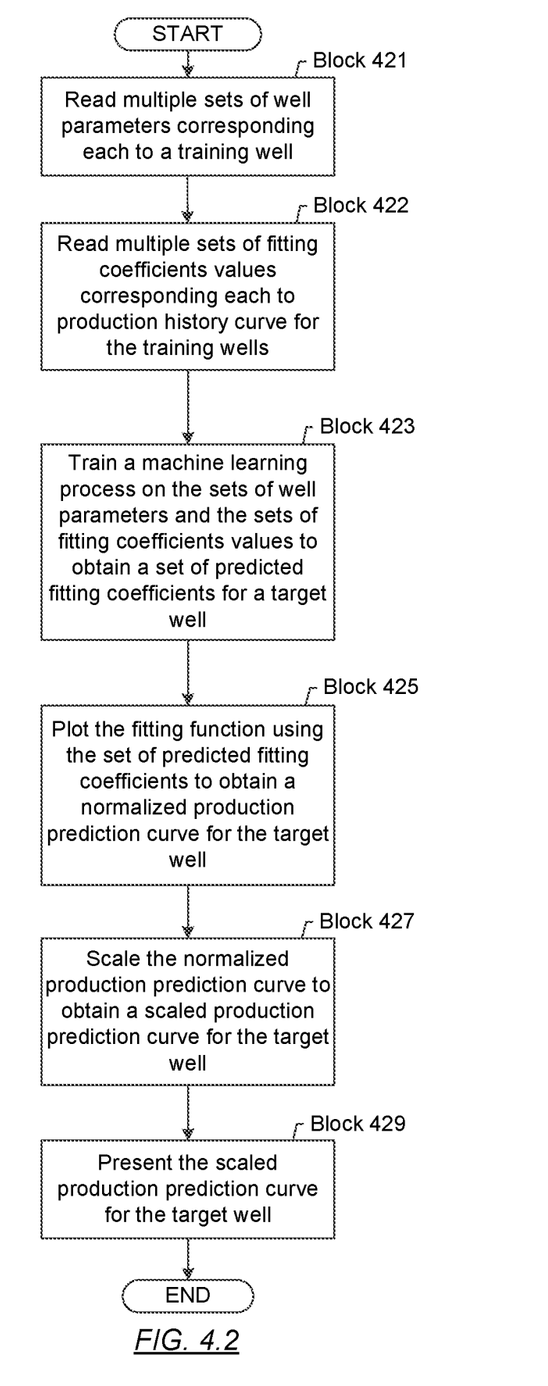

FIGS. 4.1 and 4.2 show flowcharts in accordance with one or more embodiments. While the various blocks in these flowcharts are presented and described sequentially, one of ordinary skill will appreciate that at least some of the blocks may be executed in different orders, may be combined or omitted, and at least some of the blocks may be executed in parallel. Furthermore, the actions in the blocks may be performed actively or passively. For example, some actions may be performed using polling or be interrupt driven in accordance with one or more embodiments. By way of an example, determination blocks may not involve a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

FIG. 4.1 shows a general flowchart to obtain a set of fitting coefficients for multiple production samples.

In Block 411, a production time series for a training well is read. In one or more embodiments, for each training well $W_i$, the production time series $[g_i(t_1), \ldots, g_i(t_k)]$ is obtained (for example methane gas or water data) where $t_j$ denotes time j and $g_i(t_j)$ denotes the value of the production time series for well i at time j.

In Block 412, a smoothing algorithm is applied to the production time series to obtain a smoothed production history curve. In one or more embodiments, the production time series is smoothed to obtain $[\acute{g}_i(t_1), \ldots, \acute{g}_i(t_k)]$, where $\acute{g}_i(t_j)$ denotes the value of the smoothed production history curve for well i at time j.

In Block 413, the smoothed production history curve is normalized to obtain a normalized production history curve. In one or more embodiments, the smoothed production history curve is normalized to obtain $[\hat{g}_i(t_1), \ldots, \hat{g}_i(t_k)]$, where $\hat{g}_i(t_j)$ denotes the value of the normalized history curve for well i at time j. For example, the normalization may be performed by dividing the smoothed production history curve by its maximum value.

In Block 415, a test is performed to identify if more training wells are available. In one or more embodiments, if more training wells are available, a new production time series for the training well is read in Block 411. In one or more embodiments, a dataset for n wells is defined as $[W_1, \ldots, W_n]$, where $W_i$ refers to the well number i.

In Block 417, the normalized production history curves are aggregated to determine the shape of the normalized production history curves. In one or more embodiments, the normalized production history curves from training wells are aggregated by, for example, adding each data point of the same time for training wells $\hat{g}_i(t_j)$ and extracting an average value at each time $t_j$ as described in EQ. 1 to obtain an aggregated production history curve:

$$\overline{g}_i(t_j) = \frac{\sum_{i=1}^{n} \hat{g}_i(t_j)}{n} \qquad \text{EQ. 1}$$

where $\overline{g}(t)$ is the average value of aggregated production history curve at the point $t_j$ of based on the value of the normalized production history curves at the point $t_j$.

In Block 418, a fitting function defined by a set of fitting coefficients is selected to satisfy the shape of the aggregated normalized production curves. In one or more embodiments, a fitting function that depends on a number of coefficients and that can be used to approximate the gas and water curves is selected from available fitting functions based on a process presented in Block 303. In one or more embodiments, the fitting function is formulated as $f(c_1, \ldots, c_1, t)$, where $[c_1, \ldots, c_1]$ are a set of fitting coefficients used to evaluate the fitting function.

In Block 419, the fitting function is optimized for each normalized production history curve to obtain a set of fitting coefficients for each normalized production history curve. In one or more embodiments, the optimization examines the relationship between the set of fitting coefficients of the fitting function and a response variable (dependent variable), to obtain a normalized production prediction curve that matches the normalized production history curve for each training well. In one or more embodiments, the optimization determines the value of the fitting coefficients that allow the fitting function from Block 418 to closely approximate the methane gas and water production history curves of each training well and store the found fitting coefficients for each training well. In one or more embodiments, the fitting coefficients may be obtained for example by minimizing the square error Err as presented in EQ. 2:

$$Err = \frac{1}{k} \sum_{j=1}^{k} (f(c_{i1}, \ldots, c_{il}, t_j) - \hat{g}_i(t_j))^2 \qquad \text{EQ. 2}$$

Further, the fitting coefficients $C_i$ for each well are stored as $[[x_{11}, \ldots x_{1m}, c_{11}, \ldots, c_{1l}], \ldots, [x_{n1}, \ldots, x_{nm}, c_{n1}, \ldots, c_{nl}]]$.

FIG. 4.2 shows a general flowchart to obtain a scaled production prediction curve.

In Block 421, multiple sets of well parameters corresponding each to a training well is read. In one or more embodiments, for each well $W_i$, a collection of m well parameters $[x_{i1}, \ldots, x_{im}]$ is obtained, where $x_{ij}$ denotes parameter j of well i.

In Block 422, multiple sets of fitting coefficients values are read corresponding each to a production history curve for the training wells. In one or more embodiments, the fitting coefficients $C_i$ for each normalized production history curve $[\hat{g}_i(t_1), \ldots, \hat{g}_i(t_k)]$ are read.

In Block 423, a machine learning process is trained on the sets of well parameters and the sets of fitting coefficients values to obtain a set of predicted fitting coefficients for a target well. In one or more embodiments, a machine learning algorithm (for example, a form of a neural network as described in Block 305) is trained to predict the stored coefficients from Block 419 for each set of well parameters. Further, the machine learning algorithm is trained to produce a function $h_j(x_{i1}, \ldots, x_{im}) \to c_{ij}$ for every j. For example, a number of l functions $[h_1, \ldots, h_l]$ are obtained to compute $C_i$ for every well $W_i$.

In Block 425, the fitting function is plotted using the set of predicted fitting coefficients to obtain a normalized production prediction curve for the target well. In one or more embodiments, for a target well $W_j$ with parameters $[x_{j1}, \ldots, x_{jm}]$, a normalized production prediction curve for the target well is obtained by computing $C_j = [c_{j1}, \ldots, c_{jl}]$ and evaluating $f(c_{j1}, \ldots, c_{jl}, t) \approx \hat{g}(t)$.

In Block 427, the normalized production prediction curve is scaled to obtain a scaled production prediction curve for the target well. In one or more embodiments, a scaled (denormalized) production prediction curve $\acute{g}(t)$ is estimated by multiplying the normalized production prediction curve $\hat{g}(t)$ by a suitable scaling factor. For example, the estimated methane gas and water production prediction curve for the target well is scaled using an estimate for the maximum of the curve, or from real field measurements obtained after the well is drilled.

In Block 429, the scaled production prediction curve for the target well is presented. In one or more embodiments, the production prediction curve for the target well is presented on a user interface for further analysis and decision making.

Figure 5:
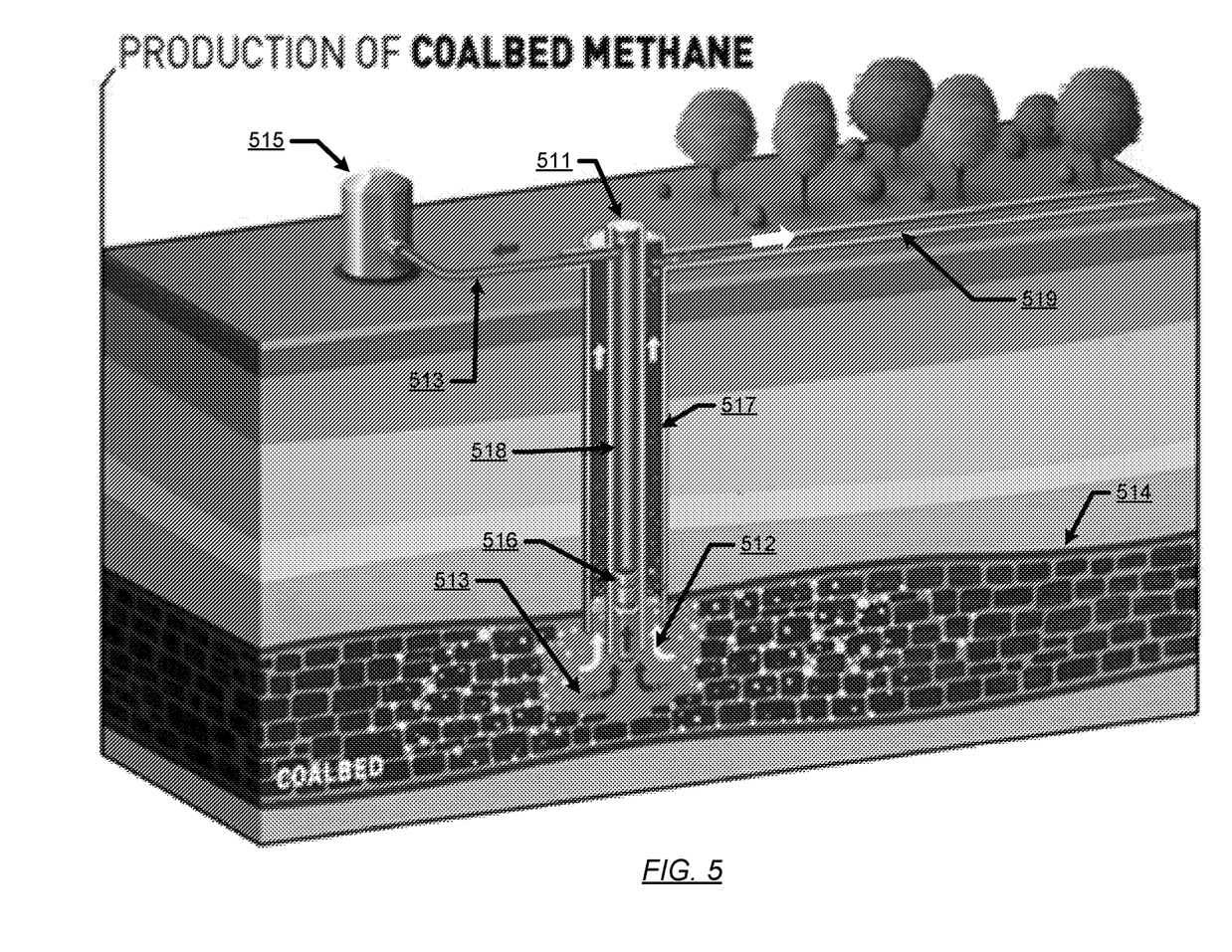

FIGS. 5, 6.1, 6.2, 7.1 and 7.2 show examples in accordance with one or more embodiments. The examples are not intended to limit embodiments described herein.

FIG. 5 shows an example of an embodiment where a methane gas is produced from a CBM well (511). In one or more embodiments, the methane gas (512) (white bubbles) produced by the CBM well (511) is extracted from subsurface coal-beds (514). In coal-beds, methane becomes adsorbed in the coal matrix and is released by fracturing the coal-bed. In one or more embodiments, the CMB wells may reach 100-2000 meters below ground surface. In one or more embodiments, large amounts of water (513) may also be in the subsurface coal-beds and extracted by the CBM well. The methane gas is extracted by drilling into the coal seam after both methane gas and water are extracted. The water (dark arrows) is extracted by the submersible pump (516) through the inner tubing of the well (518) and accumulated in water surface reservoir (515). Methane gas (white arrows) is extracted through the outer tubing of the well and sent to the surface facilities (not shown) through the gas pipeline network (519).

Figure 61:
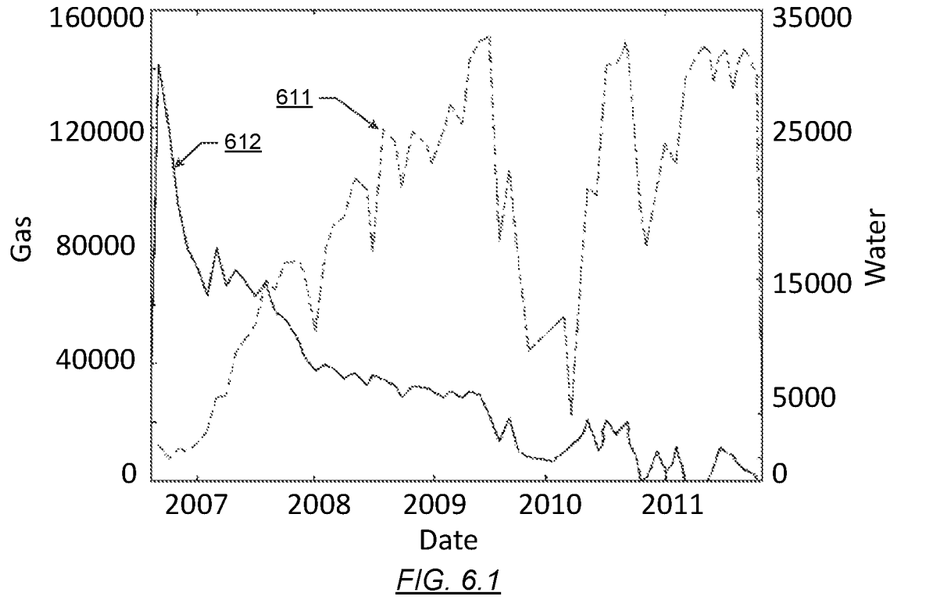
Figure 62:
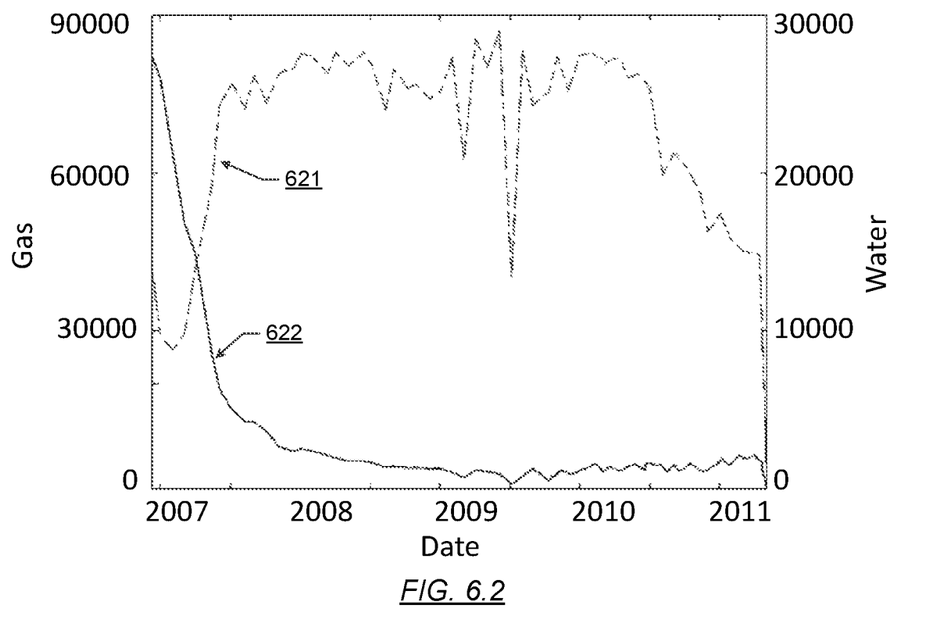

FIGS. 6.1 and 6.2 shows examples of gas (611, 621) and water (612, 622) production time series for two wells. In one or more embodiments the production time series may be captured from a variety of sources. As discussed with respect to FIG. 1, production data may be generated by sensors (S) at the wellsite or from other sources. The production time series may be transferred directly to the FM computer system (118) or transferred to the FM computer system via the surface unit (112). The production time series is then received by the data repository (210) of the FM computer system (118). In some cases, the production data may include actual production data associated with a field.

Figure 72:
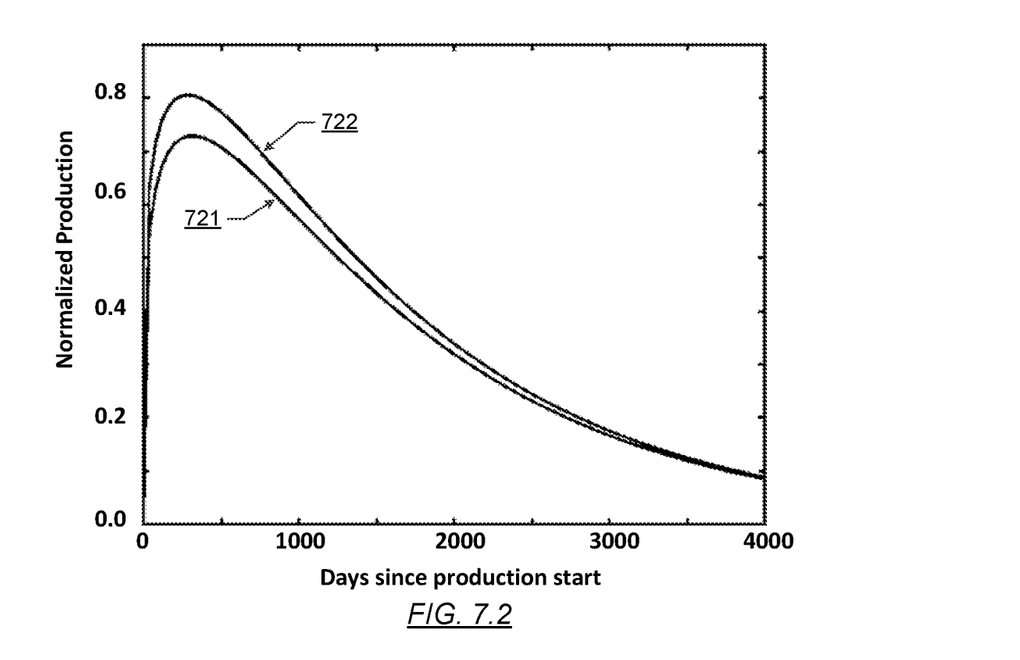

FIGS. 7.1 and 7.2 shows an example of approximate production prediction according to one or more embodiments.

FIG. 7.1 shows an example of production time series data analysis according to one or more embodiments. In one or more embodiments, a water production time series (711) from a Coal-bed methane well production is obtained. In one or more embodiments, a smoothing operator is applied to the production time series to obtain a smoothed production history curve in a process described in Block 412 for example. In one or more embodiments the smoothing operator may be described by the formula presented in EQ 3:

$$\acute{g}(t_j) = \alpha g(t_j) + (1-\alpha)g(t_{j-1}) \quad \text{EQ. 3}$$

where $\acute{g}(t_j)$ denotes the value of the smoothed history curve for the well at time j and $0 < \alpha < 1$ is a smoothing parameter to be chosen by the user. The smoothed production history curve is then normalized by dividing each time series by its maximum value to obtain a normalized production history curve (712) in a process described in Block 413 for example.

FIG. 7.2 shows an example of production prediction curve estimation according to one or more embodiments. In one or more embodiments, the normalized production history curve in FIG. 7.1 is then fit to the fitting function presented in EQ. 4 to obtain the coefficients $c_1$ and $c_2$:

$$f(c_1, c_2, t) = c_1 t^{c_2} e^{-0.75t} \quad \text{EQ. 4}$$

where e denotes the natural number 2.718281828459 . . . . The fitting function $f$ is then optimized to the normalized water production history curve using for example a least-squares minimization algorithm to obtain the fitting coefficients $c_1 = 1.30727830554$ and $c_2 = 0.215924027723$. Further, a set of well parameters for the Coal-bed methane well is read. For example of set of well parameters as presented in Table 1 is read.

TABLE 1

| XCOORD | YCOORD | CHP mean | FluidLevel mean | HP_Max mean | WL_Press mean |
|---|---|---|---|---|---|
| 714824.96 | 7133614.79 | 353.9116134 | 354.7639559 | 875.0072616 | 21.35907895 |

This dataset can then be used to train a machine learning model to predict the coefficients $c_1$ and $c_2$ for a target well. For example, a random forest machine learning algorithm is trained to use the well parameters from Table 1 to predict the fitting coefficients $c_1=1.22363$ and $c_2=0.229043$ for the target well. Further, based on the predicted fitting coefficients $c_1$ and $c_2$ a normalized production prediction curve for the water production of the target well (721) is obtained using the function $f$. In one or more embodiments, a water production time series produced by the target well is obtained and a normalized production history curve is derived for the target well (722) in order to test the approximate production prediction analysis.

As shown above, one or more embodiments provide a technique for a computer system to prediction production amounts of a target well. In particular, because production amounts of CBM wells are sporadic, direct prediction of the production amounts of the CBM wells as output of the machine learning by a computer system is challenging. Thus, by smoothing production history curves and by using machine learning to learn the coefficients rather than the production amounts directly, one or more embodiments create a technique whereby a computer system may predict the production amounts of a target well that is a CBM well.

Embodiments are implemented at least in part on a computer system. Any combination of mobile, desktop, server, router, switch, embedded device, or other types of hardware may be used. For example, as shown in FIG. 8.1, the computer system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computer system (800) may also include one or more input devices (810), such as a touchscreen, keyboard, mouse, microphone, touchpad, electronic pen, or any other type of input device.

The communication interface (812) may include an integrated circuit for connecting the computer system (800) to a network (not shown) (e.g., a local area network (LAN), a wide area network (WAN) such as the Internet, mobile network, or any other type of network) and/or to another device, such as another computing device.

Further, the computer system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computer systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, diskette, tape, flash memory, physical memory, or any other computer readable storage medium. Specifically, the software instructions may correspond to computer readable program code that, when executed by a processor(s), is configured to perform one or more embodiments.

The computer system (800) in FIG. 8.1 may be connected to or be a part of a network. For example, as shown in FIG. 8.2, the network (820) may include multiple nodes (e.g., node X (822), node Y (824)). Each node may correspond to a computer system, such as the computer system shown in FIG. 8.1, or a group of nodes combined may correspond to the computer system shown in FIG. 8.1. By way of an example, embodiments may be implemented on a node of a distributed system that is connected to other nodes. By way of another example, embodiments may be implemented on a distributed computer system having multiple nodes, where each portion may be located on a different node within the distributed computer system. Further, one or more elements of the aforementioned computer system (800) may be located at a remote location and connected to the other elements over a network.

Although not shown in FIG. 8.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computer system. The nodes may include functionality to receive requests from the client device (826) and transmit responses to the client device (826). The client device (826) may be a computer system, such as the computer system shown in FIG. 8.1. Further, the client device (826) may include and/or perform at least a portion of one or more embodiments.

The computer system or group of computer systems described in FIGS. 8.1 and 8.2 may include functionality to perform a variety of operations disclosed herein. For example, the computer system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, signal, socket, message queue, pipeline, semaphore, shared memory, message passing, and memory-mapped file. Further details pertaining to some of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of this disclosure. The processes may be part of the same or a different application and may execute on the same or a different computer system.

Rather than or in addition to sharing data between processes, the computer system performing one or more embodiments may include functionality to receive data from a user. For example, in one or more embodiments, a user may submit data via a GUI on the user device. Data may be submitted via the GUI by a user selecting one or more GUI widgets or inserting text and other data into GUI widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or another protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using the techniques described above or from storage, the computer system, in performing one or more embodiments, may extract one or more data items from the obtained data. For example, the extraction may be performed as follows by the computer system in FIG. 8.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure having layers of nodes at different levels of detail (e.g., in nested packet headers or nested document sections). Then, the raw unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computer system. For example, the computer system of FIG. 8.1, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computer system in FIG. 8.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then, the DBMS interprets the statement. The statement may be a select statement to request information, update statement, create statement, delete statement, etc. Moreover, the statement may include parameters that specify data, or a data container (e.g., database, table, record, column, view, etc.), identifier(s), conditions (e.g., comparison operators), functions (e.g. join, full join, count, average, etc.), sort (e.g. ascending, descending), or others. The DBMS may execute the statement. For example, the DBMS may access a memory buffer, may access a reference, or may index a file for reading, writing, deletion, or any combination thereof, for responding to the statement. The DBMS may load the data from persistent or non-persistent storage and perform computations to respond to the query. The DBMS may return the result(s) to the user or software application.

The computer system of FIG. 8.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computer system. For example, data may be presented to a user using a vibration generated by a handheld computer device with a predefined duration and intensity of the vibration to communicate the data.

The above description of functions presents a few examples of functions performed by the computer system of FIG. 8.1 and the nodes and/or client device in FIG. 8.2. Other functions may be performed using one or more embodiments.

Although the preceding description has been described herein with reference to particular means, materials, and embodiments, it is not intended to be limited to the particular disclosed herein. By way of further example, embodiments may be utilized in conjunction with a handheld system (i.e., a phone, wrist or forearm mounted computer, tablet, or other handheld device), portable system (i.e., a laptop or portable computer system), a fixed computer system (i.e., a desktop, server, cluster, or high performance computer system), or across a network (i.e., a cloud-based system). As such, embodiments extend to functionally equivalent structures, methods, uses, program products, and compositions as are within the scope of the appended claims.

What is claimed is:

1. A method for estimating a production prediction of a target well comprising:
   computing, based on a plurality of production time series from a plurality of training wells, a plurality of smoothed production history curves, wherein the plurality of smoothed production history curves each correspond to a training well of the plurality of training wells;
   selecting, based on the plurality of smoothed production history curves, a fitting function defined by a set of fitting coefficients;
   determining, by a machine learning process, based on a set of well parameters for the plurality of training wells, a set of predicted fitting coefficients as a function of a set of well parameters of the target well;
   applying the predicted fitting coefficients to the fitting function to compute a production prediction curve for the target well; and
   presenting the production prediction curve.

2. The method of claim 1, further comprising normalizing a smoothed production history curve in the plurality of smoothed production history curves based on a scaling factor.

3. The method of claim 1, further comprising scaling a production history curve in the plurality of production history curves based on a scaling factor.

4. The method of claim 1, wherein the production time series comprises at least one selected from a group consisting of gas production data and water production data.

5. The method of claim 1, wherein selecting the fitting function comprises:
   analyzing the shape of the plurality of smoothed production history curves to select the fitting function with the graphical representation most similar to the smoothed production history curves.

6. The method of claim 1, wherein selecting the fitting function comprises:
   statistically comparing the results of the fitting operation of the plurality of smoothed production history curves to select the fitting function that minimizes a residual value.

7. The method of claim 1, wherein the machine learning process is executed on a neural network system.

8. The method of claim 1, wherein the training wells and the target well are coal-bed methane wells.

9. The method of claim 1, further comprising performing a field operation based on the normalized production prediction curve.

10. A system for estimating a production prediction of a target well comprising:
a data repository for storing:
a plurality of production time series from a plurality of training wells; and
a computer processor operatively connection to the data repository that is configured to:
compute, based on the plurality of production time series from the plurality of training wells, a plurality of smoothed production history curves, wherein the plurality of smoothed production history curves each correspond to a training well of the plurality of training wells,
select, based on the plurality of smoothed production history curves, a fitting function defined by a set of fitting coefficients,
determine, by a machine learning process, based on a set of well parameters for the plurality of training wells, a set of predicted fitting coefficients as a function of a set of well parameters of the target well,
apply the predicted fitting coefficients to the fitting function to compute a production prediction curve for the target well, and
present the production prediction curve.

11. The system of claim 10, wherein the computer processor is further configured to normalize a smoothed production history curve in the plurality of smoothed production history curves based on a scaling factor.

12. The system of claim 10, wherein the computer processor is further configured to scale a production history curve in the plurality of production history curves based on a scaling factor.

13. The system of claim 10, wherein the production time series comprises at least one selected from a group consisting of gas production data and water production data.

14. The system of claim 10, wherein selecting the fitting function comprises:
analyzing the shape of the plurality of smoothed production history curves to select the fitting function with the graphical representation most similar to the smoothed production history curves.

15. The system of claim 10, wherein selecting the fitting function comprises:
statistically comparing the results of the fitting operation of the plurality of smoothed production history curves to select the fitting function that minimizes a residual value.

16. The system of claim 10, wherein the machine learning process is executed on a neural network system.

17. The system of claim 10, wherein the training wells and the target well are coal-bed methane wells.

18. The system of claim 10, further comprising performing a field operation based on the normalized production prediction curve.

19. A non-transitory computer readable medium comprising computer readable program code for estimating a production prediction of a target well comprising:
computing, based on a plurality of production time series from a plurality of training wells, a plurality of smoothed production history curves, wherein the plurality of smoothed production history curves each correspond to a training well of the plurality of training wells;
selecting, based on the plurality of smoothed production history curves, a fitting function defined by a set of fitting coefficients;
determining, by a machine learning process, based on a set of well parameters for the plurality of training wells, a set of predicted fitting coefficients as a function of a set of well parameters of the target well;
applying the predicted fitting coefficients to the fitting function to compute a production prediction curve for the target well; and
presenting the production prediction curve.

20. The non-transitory computer readable medium of claim 19, wherein selecting the fitting function comprises:
statistically comparing the results of the fitting operation of the plurality of smoothed production history curves to select the fitting function that minimizes a residual value.

* * * * *